US011414011B2

(12) United States Patent
Ueno

(10) Patent No.: US 11,414,011 B2
(45) Date of Patent: Aug. 16, 2022

(54) LIGHTING DEVICE FOR VEHICLE

(71) Applicant: HONDA MOTOR CO., LTD., Tokyo (JP)

(72) Inventor: Daiki Ueno, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/351,705

(22) Filed: Jun. 18, 2021

(65) Prior Publication Data

US 2021/0394673 A1   Dec. 23, 2021

(30) Foreign Application Priority Data

Jun. 23, 2020   (JP) .............................. JP2020-107584

(51) Int. Cl.
| | |
|---|---|
| *B60Q 3/76* | (2017.01) |
| *B62D 25/08* | (2006.01) |
| *B60Q 3/217* | (2017.01) |
| *B62D 25/04* | (2006.01) |
| *B60Q 3/53* | (2017.01) |
| *B60Q 3/267* | (2017.01) |

(Continued)

(52) U.S. Cl.
CPC .............. *B60Q 3/76* (2017.02); *B60Q 3/217* (2017.02); *B62D 25/04* (2013.01); *B62D 25/087* (2013.01); *B60Q 3/208* (2017.02); *B60Q 3/267* (2017.02); *B60Q 3/30* (2017.02); *B60Q 3/35* (2017.02); *B60Q 3/51* (2017.02); *B60Q 3/53* (2017.02); *B60Q 3/54* (2017.02); *B60Q 3/74* (2017.02); *B60Q 3/78* (2017.02)

(58) Field of Classification Search
CPC ........ B60Q 3/217; B60Q 3/267; B60Q 3/208; B60Q 3/30; B60Q 3/35; B60Q 3/51; B60Q 3/53; B60Q 3/54; B60Q 3/74; B60Q 3/78
See application file for complete search history.

(56) References Cited

U.S. PATENT DOCUMENTS

| | | | |
|---|---|---|---|
| 6,763,778 B2* | 7/2004 | Bergquist | B60Q 1/302 116/28 R |
| 7,226,112 B2* | 6/2007 | Ward | B60J 5/101 296/146.8 |

(Continued)

FOREIGN PATENT DOCUMENTS

| | | | |
|---|---|---|---|
| DE | 102006012606 A1 * | 11/2007 | B60Q 3/225 |
| JP | 2016-016675 A | 2/2016 | |

(Continued)

*Primary Examiner* — Colin J Cattanach
(74) *Attorney, Agent, or Firm* — Squire Patton Boggs (US) LLP

(57) ABSTRACT

A lighting device for a vehicle includes a map lamp, left and right rear seat reading lamps, left and right trunk lightings, left and right rear gate lightings, and left and right rear pillar lightings. The map lamp, the left rear seat reading lamp, the left trunk lighting, the left rear gate lighting, and the left rear pillar lighting are disposed along a left connecting line. In addition, the map lamp, the right rear seat reading lamp, the right trunk lighting, the right rear gate lighting, and the right rear pillar lighting are disposed along a right connecting line. The left and right connecting lines extend such that a gap in a vehicle width direction is gradually reduced from a rear side of the vehicle toward a front side of the vehicle.

4 Claims, 1 Drawing Sheet

(51) Int. Cl.
*B60Q 3/74* (2017.01)
*B60Q 3/51* (2017.01)
*B60Q 3/54* (2017.01)
*B60Q 3/30* (2017.01)
*B60Q 3/78* (2017.01)
*B60Q 3/208* (2017.01)
*B60Q 3/35* (2017.01)

(56) References Cited

U.S. PATENT DOCUMENTS

| | | | |
|---|---|---|---|
| 9,840,193 B1* | 12/2017 | Chea | B60Q 3/217 |
| 2009/0129105 A1* | 5/2009 | Kusu | B60Q 3/80 |
| | | | 362/464 |
| 2014/0153269 A1* | 6/2014 | Huang | B60Q 1/52 |
| | | | 362/464 |
| 2015/0062941 A1* | 3/2015 | Sura | B60Q 3/82 |
| | | | 362/488 |
| 2015/0138806 A1* | 5/2015 | Salter | B60Q 3/30 |
| | | | 362/510 |
| 2015/0197194 A1* | 7/2015 | Salter | B60Q 3/68 |
| | | | 362/510 |
| 2015/0274067 A1* | 10/2015 | Salter | B60Q 3/78 |
| | | | 362/510 |
| 2015/0283943 A1* | 10/2015 | Huebner | H05B 47/17 |
| | | | 362/545 |
| 2016/0010818 A1* | 1/2016 | Johnson | B60Q 3/30 |
| | | | 362/464 |
| 2017/0246984 A1* | 8/2017 | Snider | B60J 1/1876 |
| 2019/0016262 A1* | 1/2019 | Thiebaud | B60Q 3/64 |
| 2019/0176601 A1* | 6/2019 | Kena | B60Q 3/30 |
| 2019/0176679 A1* | 6/2019 | Salter | B60Q 9/006 |
| 2019/0283664 A1* | 9/2019 | Kang | B60Q 1/0483 |
| 2020/0001783 A1* | 1/2020 | Suzuki | H04N 13/204 |
| 2020/0139814 A1* | 5/2020 | Galan Garcia | B32B 27/065 |

FOREIGN PATENT DOCUMENTS

| | | | |
|---|---|---|---|
| JP | 2016-030502 A | 3/2016 | |
| WO | WO-2017144042 A1 * | 8/2017 | E05B 17/10 |

* cited by examiner

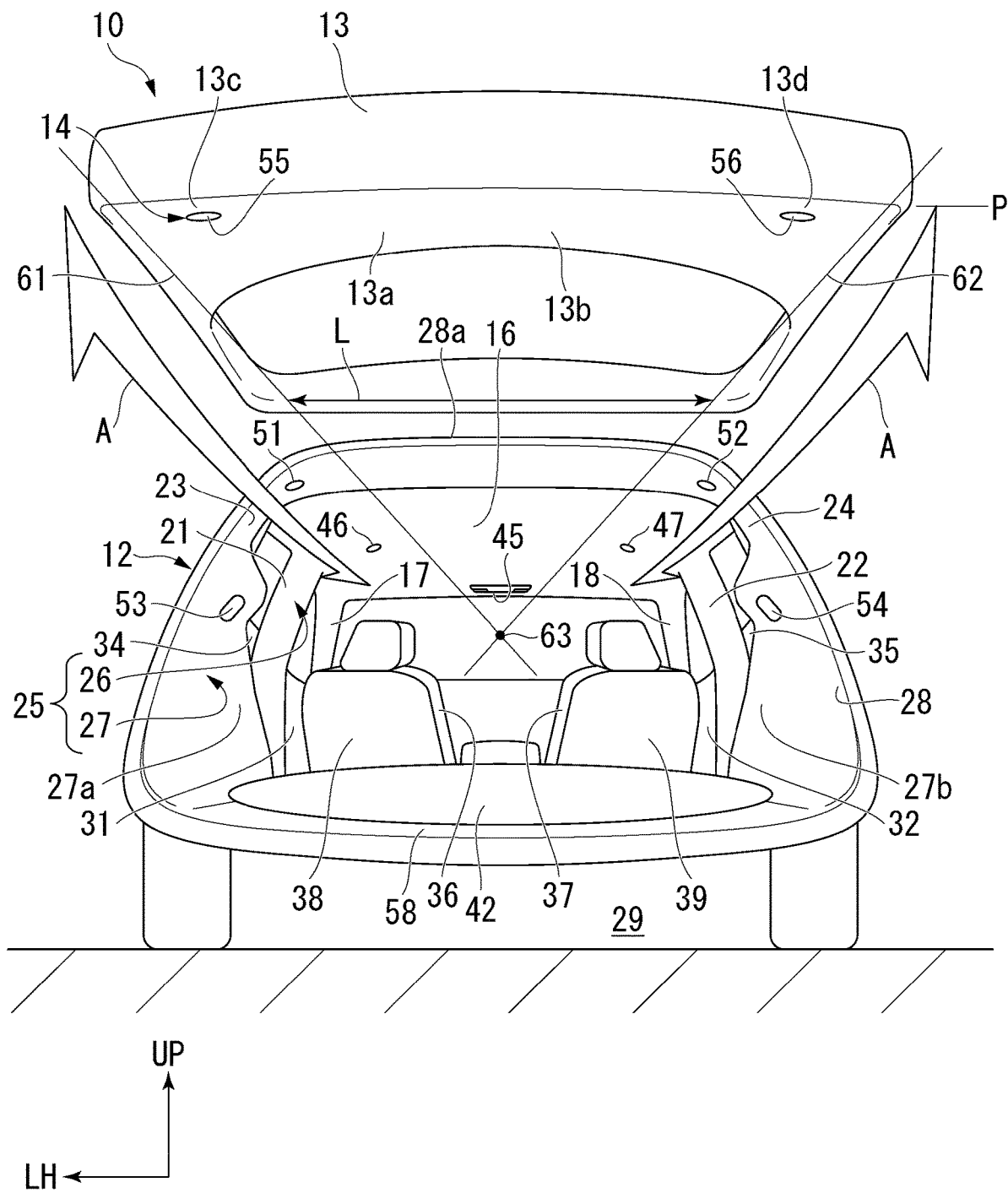

LIGHTING DEVICE FOR VEHICLE

CROSS-REFERENCE TO RELATED APPLICATION

Priority is claimed on Japanese Patent Application No. 2020-107584, filed Jun. 23, 2020, the content of which is incorporated herein by reference.

BACKGROUND OF THE INVENTION

Field of the Invention Perspective

The present invention relates to a lighting device for a vehicle.

Description of Related Art

For example, as a vehicle in which a luggage room is made to feel wider, a vehicle in which protrusions of a floor board of a luggage room are formed so that the interval between the protrusions in a vehicle width direction gradually reduce from a rear side of the vehicle toward a front side of the vehicle is known. By making the interval between the protrusions gradually reduce toward the front side of the vehicle, space in the luggage room can be made to feel wider in depth direction due to the perspective sensation (for example, see Japanese Unexamined Patent Application, First Publication No. 2016-16675).

In addition, as a vehicle in which a passenger compartment is made to feel wider in depth, a vehicle in which concave grooves of a roof lining of a ceiling are formed from a rear side of the vehicle toward a front side of the vehicle so as to gradually reduce gaps in a vehicle width direction is known. When the gaps between the concave grooves is gradually reduced toward a front side of the vehicle, an occupant who sits on a rear seat can be caused to feel that the space in the passenger compartment is wider in depth direction due to the perspective sensation (for example, see Japanese Unexamined Patent Application, First Publication No. 2016-30502).

SUMMARY OF THE INVENTION

However, the vehicle disclosed in Japanese Unexamined Patent Application, First Publication No. 2016-16675 has a configuration of making the depth of the luggage room feel wider. In addition, the vehicle disclosed in Japanese Unexamined Patent Application, First Publication No. 2016-30502 has a configuration of making the depth of the passenger compartment feel wider. For this reason, it is desired to put into practical use a configuration of making a depth feel wider in a wider region of the vehicle.

An aspect of the present invention provides a lighting device for a vehicle capable of making a depth feel wider in a wide region of a vehicle.

(1) A lighting device for a vehicle according to an aspect of the present invention includes a first lighting body installed at a position where an occupant sitting on a seat is illuminated; a second lighting body installed at a position where an in-vehicle space is illuminated; third lighting bodies installed at left and right positions in a lower section of a rear gate; and fourth lighting bodies installed at positions in a vicinity of left and right doors, and the first lighting body, the second lighting body, the third lighting bodies and the fourth lighting bodies are disposed along left and right connecting lines along which a gap in a vehicle width direction is gradually reduced from a rear side of the vehicle toward a front side of the vehicle.

According to the configuration of the aspect of the above-mentioned (1), the plurality of lighting bodies are disposed along the left and right connecting lines. Accordingly, the plurality of lighting bodies can be disposed such that a lateral gap of the plurality of lighting bodies is gradually reduced from a rear side of the vehicle to a front side of the vehicle. Accordingly, a perspective sensation can be produced by the plurality of lighting bodies, and expanse in the depth direction can be felt in a wider region in the vehicle.

(2) In the aspect of the above-mentioned (1), the third lighting bodies installed at the left and right positions in the lower section of the rear gate may be disposed such that the first lighting body, the second lighting body, the third lighting bodies and the fourth lighting bodies continuously illuminate an outside of the vehicle and an inside of the vehicle in a state in which the rear gate is opened.

According to the configuration of the aspect of the above-mentioned (2), in a state in which the rear gate is opened, the outside and the inside of the vehicle can be continuously illuminated by the plurality of lighting bodies. Accordingly, the outside and the inside of the vehicle can be seen as one space, and the depth can be further felt in a wide area from the outside to the inside of the vehicle. For example, in particular, in the evening or the like when the plurality of lighting bodies are easily seen, the depth can be felt even more in a wide region from the outside to the inside of the vehicle.

(3) In the aspect of the above-mentioned (1) or (2), the second lighting body installed at a position where the in-vehicle space is illuminated and the fourth lighting bodies installed at positions in the vicinity of the left and right doors may be disposed in a vicinity of the third lighting bodies installed at the left and right positions in the lower section of the rear gate, and the third lighting bodies installed at the left and right positions in the lower section of the rear gate, the second lighting body installed at the position where the in-vehicle space is illuminated, and the fourth lighting bodies installed at the position in the vicinity of the left and right doors may be configured to be automatically turned on and off according to opening and closing of the rear gate.

According to the configuration of the aspect of the above-mentioned (3), the lighting bodies installed at the left and right positions of the lower section of the rear gate, at the position where the in-vehicle space is illuminated and at positions in the vicinity of the left and right doors can be automatically turned on and off according to the opening and closing of the rear gate. Accordingly, for example, when luggage is loaded in the luggage room, the luggage room or surroundings of the luggage room can be easily brightly illuminated, and convenience for the user can be enhanced.

Further, when the luggage is loaded in an in-vehicle space such as a trunk or the like, the in-vehicle space or surroundings thereof can be illuminated with sufficient brightness by turning on the lighting bodies installed at the left and right positions in the lower section of the rear gate, at the position where the in-vehicle space is illuminated and at the positions in the vicinity of the left and right doors.

In addition, for example, even when the luggage room is full of luggage and the lighting body is installed at a position where the in-vehicle space is illuminated is hidden by the luggage, necessary brightness can be maintained in the luggage room or surroundings of the luggage room by using the lighting bodies installed at the left and right positions of the lower section of the rear gate or the positions in the vicinity of the left and right doors. Accordingly, convenience for the user can be further enhanced.

In addition, when these lighting bodies are turned on, a sense of oneness (a sense of unity) can be felt in a wide region between the inside of the vehicle and the outside of the vehicle.

(4) In the aspect of any one of the above-mentioned (1) to (3), the second lighting body installed at the position where the in-vehicle space is illuminated and the fourth lighting bodies installed at the positions in the vicinity of the left and right doors may be disposed in a vicinity of the third lighting bodies installed at the left and right positions in the lower section of the rear gate, and the third lighting bodies installed at the left and right positions in the lower section of the rear gate, the second lighting body installed at the position where the in-vehicle space is illuminated, and the fourth lighting bodies installed at the positions in the vicinity of the left and right doors may be disposed along the left and right connecting lines in a state in which the rear gate is opened.

According to the configuration of the aspect of the above-mentioned (4), in a state in which the rear gate is opened, the lighting bodies installed at the left and right positions of the lower section of the rear gate, at the position where the in-vehicle space is illuminated, and at the positions in the vicinity of the left and right doors are disposed along the left and right connecting lines. Accordingly, a lateral gap between the plurality of lighting bodies can be gradually reduced from a rear side of the vehicle to a front side of the vehicle. Accordingly, in a state in which the rear gate is opened, a perspective sensation can be produced by the plurality of lighting bodies, and for example, expense in the depth direction in a wider region in the vehicle can be felt.

Further, when the luggage is loaded in the in-vehicle space such as a trunk or the like, the in-vehicle space or surroundings thereof can be illuminated with sufficient brightness by turning on the lighting bodies installed at the left and right positions of the lower section of the rear gate, at the position where the in-vehicle space is illuminated, and at the positions in the vicinity of the left and right doors.

In addition, when these lighting bodies are turned on, the wide region between the inside of the vehicle and the outside of the vehicle can be seen as one space, and a sense of unity can be felt.

According to the aspect of the present invention, the plurality of lighting bodies are disposed such that the lateral gap between the plurality of lighting bodies is gradually reduced from an rear side of the vehicle toward a front side of the vehicle. Accordingly, expanse in the depth direction in a wider region in the vehicle can be felt.

BRIEF DESCRIPTION OF THE DRAWINGS

FIG. 1 is a rear view showing a state in which a rear gate of a vehicle including a lighting device for a vehicle of an embodiment of the present invention is opened.

DETAILED DESCRIPTION OF THE INVENTION

Hereinafter, a lighting device for a vehicle according to an embodiment of the present invention will be described with reference to the accompanying drawings. In the drawings, an arrow UP indicates an upward direction of a vehicle, and an arrow LH indicates a leftward direction of the vehicle.

<Vehicle>

As shown in the drawings, a vehicle 10 includes a vehicle main body 12, a rear gate (a tailgate) 13 and a lighting device 14 for a vehicle. In the following description, "the lighting device 14 for a vehicle" will simply be called "the lighting device 14."

The vehicle main body 12 includes a roof lining 16, left and right front pillars 17 and 18, left and right center pillars 21 and 22, left and right rear pillars 23 and 24, a passenger compartment 26, a luggage room 27 and a rear opening section 28.

A left front side door 31 is provided between the left front pillar 17 and the left center pillar 21 to be opened and closed. A right side door 32 is provided between the right front pillar 18 and the right center pillar 22 to be opened and closed.

A left rear side door (a door) 34 is provided between the left center pillar 21 and the left rear pillar 23 to be opened and closed. A right rear side door (a door) 35 is provided between the right center pillar 22 and the right rear pillar 24 to be opened and closed.

The passenger compartment 26 is a space that is occupied by an occupant, and is provided, for example, between the left and right front pillars 17 and 18 and the left and right rear pillars 23 and 24 in the vehicle forward/rearward direction. For example, left and right front seats (seats) 36 and 37 and left and right rear seats (seats) 38 and 39 are provided in the passenger compartment 26 while having a gap in the vehicle forward/rearward direction. In addition, the left and right front seats 36 and 37 are disposed on, for example, left and right sides in the vehicle width direction. The left and right rear seats 38 and 39 are disposed on, for example, left and right sides in the vehicle width direction.

Further, while the rear seats 38 and 39 divided on left and right sides have been described as rear seats in the embodiment, there is no limitation thereto. As another example, the rear seats may be a bench seat. In addition, while the example in which the left and right front seats 36 and 37 and the left and right rear seats 38 and 39 are provided in two columns in the vehicle forward/rearward direction has been described in the embodiment, as another embodiment, only the left and right front seats 36 and 37 may be provided. Alternatively, a third column of seats may be provided behind the left and right front seats 36 and 37 and the left and right rear seats 38 and 39 of the vehicle.

The luggage room 27 is provided behind the passenger compartment 26 of the vehicle. The luggage room 27 is a space (an in-vehicle space such as a trunk or the like) for loading luggage 42, and is substantially provided between the left and right rear pillars 23 and 24 and the rear opening section 28 in the vehicle forward/rearward direction. The rear gate 13 is provided in the rear opening section 28. The luggage room 27 and the passenger compartment 26 form an internal region 25 of the vehicle 10 (the inside of the vehicle 10).

<Rear Gate>

The rear gate 13 is supported by an upper section 28a of the rear opening section 28 via a gate hinge (not shown) to be opened and closed. The rear gate 13 has an inner wall 13a disposed at substantially the same height as the roof lining 16 in a state in which the rear gate 13 is opened to an open position P at which the rear opening section 28 is opened. The rear gate 13 is disposed to extend linearly from a rear end portion of the roof lining 16 toward the rearward of the vehicle. Meanwhile, when the rear gate 13 is closed at the closed position, the rear opening section 28 can be closed by the rear gate 13.

<Lighting Device>

The lighting device 14 is provided between the vehicle main body 12 and the rear gate 13 of the vehicle 10. The lighting device 14 includes, for example, a map lamp 45, left and right rear seat reading lamps 46 and 47, left and right rear pillar lightings 51 and 52, left and right trunk lightings 53 and 54, and left and right rear gate lightings 55 and 56, as a plurality of lighting bodies.

The left and right rear seat reading lamps 46 and 47, the left and right rear pillar lightings 51 and 52, the left and right trunk lightings 53 and 54, and the left and right rear gate lightings 55 and 56 are laterally symmetrical lighting bodies.

The map lamp 45 is a lighting body (a first lighting body) installed at a position where the map lamp 45 illuminates occupants sitting on the left and right front seats 36 and 37. Specifically, the map lamp 45 is provided in the passenger compartment 26 near a front end portion of the roof lining 16 and at a center in the vehicle width direction. The map lamp 45 is, for example, a lighting that illuminates hands of occupants sitting on the left and right front seats 36 and 37 so that the occupants of the left and right front seats (a driver's seat and an assistant driver's seat) can see a map or the like. The map lamp 45 includes, for example, a push button switch (not shown). When the push button switch is pushed, the map lamp 45 can be turned on and off.

The left rear seat reading lamp 46 (the first lighting body) is a lighting body installed at a position where the lamp illuminates the occupant sitting on the left rear seat 38. Specifically, the left rear seat reading lamp 46 is provided at, for example, an area of the roof lining 16 near the left center pillar 21 in the vehicle width direction. The left rear seat reading lamp 46 is disposed at a left outer side of the map lamp 45 in the vehicle width direction and a rear side of the vehicle. The left rear seat reading lamp 46 is a lighting that illuminates hands of the occupant sitting on the left rear seat 38 for the occupant on the left rear seat 38 to read a book, a document, or the like.

The right rear seat reading lamp 47 (the first lighting body) is a lighting body installed at a position where the lamp illuminates the occupant sitting on the right rear seat 39. Specifically, the right rear seat reading lamp 47 is provided in, for example, an area of the roof lining 16 near the right center pillar 22 in the vehicle width direction. The right rear seat reading lamp 47 is disposed at a right outer side of the map lamp 45 in the vehicle width direction and a rear side of the vehicle. The right rear seat reading lamp 47 is a lighting that illuminates hands of the occupant sitting on the right rear seat 39 for the occupant on the right rear seat 39 to read a book, a document, or the like.

The left rear seat reading lamp 46 and the right rear seat reading lamp 47 are disposed at laterally symmetrical positions in the vehicle width direction. The left and right rear seat reading lamps 46 and 47 include, for example, electrostatic switches (capacitance touch switches), which are not shown. When the electrostatic switches are contacted (touched), the left and right rear seat reading lamps 46 and 47 can be turned on and off. In addition, the left and right rear seat reading lamps 46 and 47 are also referred to as, for example, rear personal lamps, or the like.

The left rear pillar lighting 51 is a lighting body (a fourth lighting body) installed in the vicinity of an upper rear section of the left rear side door 34. Specifically, the left rear pillar lighting 51 is provided in, for example, an area of the roof lining 16 in the vicinity of the upper end section of the left rear pillar 23 in the vehicle width direction and disposed near a left front end of the luggage room 27. The left rear pillar lighting 51 is disposed at a left outer side of the left rear seat reading lamp 46 in the vehicle width direction and on a rear side of the vehicle. The left rear pillar lighting 51 is a lighting that illuminates a left front upper section of the luggage room 27.

The right rear pillar lighting 52 is a lighting body (a fourth lighting body) installed in the vicinity of the upper rear section of the right rear side door 35. Specifically, the right rear pillar lighting 52 is provided in, for example, an area of the roof lining 16 in the vicinity of the upper end section of the right rear pillar 24 in the vehicle width direction and disposed near a right front end of the luggage room 27. The right rear pillar lighting 52 is disposed at a right outer side of the right rear seat reading lamp 47 in the vehicle width direction and on a rear side of the vehicle. The right rear pillar lighting 52 is a lighting that illuminates a right front upper section of the luggage room 27.

The left rear pillar lighting 51 and the right rear pillar lighting 52 are disposed at laterally symmetrical positions in the vehicle width direction. For example, the left and right rear pillar lightings 51 and 52 can be turned on and off in conjunction with the opening and closing of the rear gate 13. Specifically, the left and right rear pillar lightings 51 and 52 are automatically turned on in conjunction with the rear gate 13 in a state in which the rear gate 13 is opened. When the left and right rear pillar lightings 51 and 52 are turned on, the entire region of the upper section of the luggage room 27 or surroundings of the entire region of the upper section can be brightly illuminated by illuminating the left front upper section and the right front upper section of the luggage room 27. Meanwhile, the left and right rear pillar lightings 51 and 52 are automatically turned off in conjunction with the rear gate 13 in a state in which the rear gate 13 is closed.

The left trunk lighting 53 is a lighting body (a second lighting body) installed at a position where the lighting illuminates a left region of the luggage room 27. Specifically, the left trunk lighting 53 is provided in, for example, an area of a left sidewall 27a of the luggage room 27 behind the lower end portion of the left rear pillar 23 in the vehicle. Accordingly, for example, the left trunk lighting 53 is disposed at substantially a center of the luggage room 27 in the vehicle forward/rearward direction and at substantially a center of the luggage room 27 in the upward/downward direction as well. The left trunk lighting 53 is disposed at a left outer side of the left rear pillar lighting 51 in the vehicle width direction and on a rear side of the vehicle. The left trunk lighting 53 is a lighting that illuminates a luggage room floor 58 in a left side region of the luggage room 27.

The right trunk lighting 54 is a lighting body (a second lighting body) disposed at a position where the lighting illuminates a right region of the luggage room 27. Specifically, the right trunk lighting 54 is provided in, for example, an area of a right sidewall 27b of the luggage room 27 behind a lower end portion of the right rear pillar 24 in the vehicle. Accordingly, for example, the right trunk lighting 54 is disposed at substantially a center of the luggage room 27 in the vehicle forward/rearward direction and at substantially a center of the luggage room 27 in the upward/downward direction as well. The right trunk lighting 54 is disposed at a right outward side of the right rear pillar lighting 52 in the vehicle width direction and a rear side of the vehicle. The right trunk lighting 54 is a lighting that illuminates the luggage room floor 58 in a right region of the luggage room 27.

The left trunk lighting 53 and the right trunk lighting 54 are disposed at laterally symmetrical positions in the vehicle width direction. For example, the left and right trunk lightings 53 and 54 can be turned on and off in conjunction with the opening and closing of the rear gate 13. Specifically, the left and right trunk lightings 53 and 54 are automatically turned on in conjunction with the rear gate 13 in a state in which the rear gate 13 is opened. When the left and right trunk lightings 53 and 54 are turned on, the entire region of the luggage room floor 58 or surroundings of the entire region of the luggage room floor 58 can be brightly illuminated by illuminating the luggage room floor 58 in regions of the luggage room 27 on left and right sides. Meanwhile, the left and right trunk lightings 53 and 54 are automatically turned off in conjunction with the rear gate 13 in a state in which the rear gate 13 is closed.

For example, the left rear gate lighting 55 (the third lighting body) is installed at a left position (left and right positions in a lower section of the rear gate) 13c of a lower section (a lower section of the rear gate) 13b in the inner wall 13a of the rear gate 13. The left rear gate lighting 55 is disposed at a left outer side of the left rear pillar lighting 51 in the vehicle width direction and a rear side of the vehicle in a state in which the rear gate 13 is opened at the open position P.

For example, the right rear gate lighting 56 (the third lighting body) is installed at a right position (left and right positions in the lower section of the rear gate) 13d of the lower section 13b in the inner wall 13a of the rear gate 13. The right rear gate lighting 56 is disposed at a left outer side of the right rear pillar lighting 52 in the vehicle width direction and a rear side of the vehicle in a state in which the rear gate 13 is opened at the open position P.

The left rear gate lighting 55 and the right rear gate lighting 56 are disposed at laterally symmetrical positions in the vehicle width direction. For example, the left and right rear gate lightings 55 and 56 are turned on and off in conjunction with the opening and closing of the rear gate 13. Specifically, the left and right rear gate lightings 55 and 56 are automatically turned on in conjunction with the rear gate 13 in a state in which the rear gate 13 is opened. When the left and right rear gate lightings 55 and 56 are turned on, an external region (the outside of the vehicle 10) 29 below the rear gate 13 can be brightly illuminated by illuminating the region of the rear opening section 28 on a rearward side of the vehicle. Meanwhile, the left and right rear gate lightings 55 and 56 are automatically turned off in conjunction with the rear gate 13 in a state in which the rear gate 13 is closed.

Here, in the lighting device 14, in a state in which the rear gate 13 is opened, the left rear seat reading lamp 46, the left rear pillar lighting 51, and the left rear gate lighting 55 are disposed along a left connecting line 61. Further, the left trunk lighting 53 is substantially disposed along the left connecting line 61 at below the left connecting line 61.

In addition, in the lighting device 14, in a state in which the rear gate 13 is opened, the right rear seat reading lamp 47, the right rear pillar lighting 52, and the right rear gate lighting 56 are disposed along a right connecting line 62. Further, the right trunk lighting 54 is substantially disposed along the right connecting line 62 at below the right connecting line 62.

The left and right connecting lines 61 and 62 are virtual lines diagonally extending such that a gap L in the vehicle width direction is gradually reduced from a rear side of the vehicle toward a front side of the vehicle. The left connecting line 61 and the right connecting line 62 extend at laterally symmetrical positions in the vehicle width direction. Accordingly, the left and right rear gate lightings 55 and 56, the left and right trunk lightings 53 and 54, the left and right rear pillar lightings 51 and 52, and the left and right rear seat reading lamps 46 and 47 are disposed such that lateral gaps are gradually reduced from a rear side of the vehicle toward a front side of the vehicle.

Here, the left connecting line 61 and the right connecting line 62 have front ends that cross each other at a vanishing point 63 that is a center in the vehicle width direction. The map lamp 45 is disposed in the vicinity of the vanishing point 63 in the vehicle forward/rearward direction. The map lamp 45 is disposed in front of the left and right rear seat reading lamps 46 and 47 in the vehicle body and between the left and right rear seat reading lamps 46 and 47.

As described above, according to the lighting device 14 of the embodiment, the left rear gate lighting 55, the left trunk lighting 53, the left rear pillar lighting 51, the left rear seat reading lamp 46, and the map lamp 45 are disposed along the left connecting line 61. In addition, the right rear gate lighting 56, the right trunk lighting 54, the right rear pillar lighting 52, the right rear seat reading lamp 47, and the map lamp 45 are disposed along the right connecting line 62.

Accordingly, perspective sensation can be produced by the left and right rear gate lightings 55 and 56, the left and right trunk lightings 53 and 54, the left and right rear pillar lightings 51 and 52, the left and right rear seat reading lamps 46 and 47, and the map lamp 45. Accordingly, a wide region in the vehicle 10 including the passenger compartment 26, the luggage room 27 and the external region 29 below the rear gate 13 can be made to look like one continuous space as shown by an arrow A, and expanse in the depth direction can be felt.

In addition, in a state in which the rear gate 13 is opened at the open position P, by turning on the left and right rear pillar lightings 51 and 52, the entire region of the upper section of the luggage room 27 or surroundings of the entire region of the upper section can be brightly illuminated. Further, by turning on the left and right trunk lightings 53 and 54, the entire region of the luggage room floor 58 or surroundings of the entire region of the luggage room floor 58 can be brightly illuminated. In addition, by turning on the left and right rear gate lightings 55 and 56, the external region 29 below the rear gate 13 can be brightly illuminated.

That is, the left and right rear pillar lightings 51 and 52, the left and right trunk lightings 53 and 54, and the left and right rear gate lightings 55 and 56 are disposed at positions where the luggage room 27, the passenger compartment 26 and the external region 29 below the rear gate 13 are continuously illuminated. The external region 29 below the rear gate 13 is the outside of the vehicle 10. The luggage room 27 and the passenger compartment 26 are the inside of the vehicle 10.

Accordingly, in a state in which the rear gate 13 is opened, the outside of the vehicle 10 and the inside of the vehicle 10 are continuously illuminated, and it is possible to make the outside and the inside of the vehicle 10 look like one space. Accordingly, the depth can be further felt in a wide region from the outside of the vehicle 10 toward the inside of the vehicle 10.

Here, for example, the left and right rear pillar lightings 51 and 52, the left and right trunk lightings 53 and 54, and the left and right rear gate lightings 55 and 56, and the like, which are turned on, can be especially easily seen in the evening or the like. Accordingly, the depth can be further felt in a wide region from the outside of the vehicle 10 to the inside of the vehicle 10.

In addition, the appearance of the outside of the vehicle 10 and the inside of the vehicle 10 can be made into a symmetry fashion having a sense of oneness by using the left and right rear pillar lightings 51 and 52, the left and right trunk lightings 53 and 54, the left and right rear gate lightings 55 and 56, and the like in a state in which the rear gate 13 is opened.

Further, the left trunk lighting 53, and the left rear pillar lighting 51 are substantially disposed in the vicinity of the left rear gate lighting 55. In addition, the right trunk lighting 54, and the right rear pillar lighting 52 are substantially disposed in the vicinity of the right rear gate lighting 56. Further, the left and right trunk lightings 53 and 54, the left and right rear pillar lightings 51 and 52, and the left and right rear gate lightings 55 and 56 is configured to be automatically turned on and off according to the opening and closing of the rear gate.

Accordingly, for example, when luggage is loaded in the luggage room 27 from the rear opening section 28, the luggage room 27 or surroundings of the luggage room 27 can be easily brightly illuminated, and convenience of a user can be increased.

Further, when the luggage 42 is loaded in the luggage room 27, the left and right rear gate lightings 55 and 56, the left and right trunk lightings 53 and 54, and the left and right rear pillar lightings 51 and 52 are turned on, and thus, the luggage room 27 or surroundings of the luggage room 27 can be illuminated with sufficient brightness.

In particular, the left and right rear gate lightings 55 and 56, the left and right trunk lightings 53 and 54, and the left and right rear pillar lightings 51 and 52 illuminate symmetrically the outside of the vehicle 10 or the inside of the vehicle 10, and thus, a shadow area can be reduced. Accordingly, the outside of the vehicle 10 or the inside of the vehicle 10 can be illuminated with uniform brightness.

In addition, for example, even when the luggage room 27 is full of luggage and the left and right trunk lightings 53 and 54 are hidden by the luggage, the luggage room 27 or surroundings of the luggage room 27 can be held with necessary brightness by the left and right rear pillar lightings 51 and 52 or the left and right rear gate lightings 55 and 56. Accordingly, convenience of the user can be further enhanced.

In addition, when the left and right rear gate lightings 55 and 56, the left and right trunk lightings 53 and 54, and the left and right rear pillar lightings 51 and 52 are turned on, a sense of oneness (a sense of unity) can be felt in a wide region at the inside of the vehicle 10 and the outside of the vehicle 10.

Further, in a state in which the rear gate 13 is opened, the left rear gate lighting 55, the left trunk lighting 53, and the left rear pillar lighting 51, which are turned on, are disposed along the left connecting line 61. In addition, the right rear gate lighting 56, the right trunk lighting 54, and the right rear pillar lighting 52, which are turned on, are disposed along the right connecting line 62.

Accordingly, in a state in which the rear gate 13 is opened, perspective sensation can be produced by the left and right rear seat reading lamps 46 and 47, and the map lamp 45, in addition to the left and right rear gate lightings 55 and 56, the left and right trunk lightings 53 and 54, and the left and right rear pillar lightings 51 and 52. Accordingly, for example, expense in the depth can be felt in a wider region in the vehicle 10.

In addition, when the left and right rear gate lightings 55 and 56, the left and right trunk lightings 53 and 54, and the left and right rear pillar lightings 51 and 52 are turned on, a sense of oneness can be further felt in a wide region at the inside of the vehicle 10 and the outside of the vehicle 10.

Further, the technical scope of the present invention is not limited to the embodiment, and various modifications may be made without departing from the scope of the present invention.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lighting device for a vehicle comprising:
a left first lighting body and a right first lighting body that are installed on a roof lining at positions where an occupant sitting on a seat is illuminated and that are disposed at laterally symmetrical positions in a vehicle width direction;
a left second lighting body and a right second lighting body that are installed in a luggage room at positions where an in-vehicle space is illuminated and that are disposed at laterally symmetrical positions in the vehicle width direction;
a left third lighting body and a right third lighting body that are installed at laterally symmetrical positions in the vehicle width direction in an inner wall of a lower section of a rear gate; and
a left fourth lighting body and a right fourth lighting body that are installed at positions in a vicinity of upper rear sections of left and right rear side doors and that are disposed at laterally symmetrical positions in the vehicle width direction,
wherein the left fourth lighting body is disposed at a left outer side of the left first lighting body in the vehicle width direction and on a rear side of the left first lighting body in the vehicle,
wherein the right fourth lighting body is disposed at a right outer side of the right first lighting body in the vehicle width direction and on a rear side of the right first lighting body in the vehicle,
wherein the left second lighting body is disposed at a left outer side of the left fourth lighting body in the vehicle width direction and on a rear side of the left fourth lighting body in the vehicle,
wherein the right second lighting body is disposed at a right outer side of the right fourth lighting body in the vehicle width direction and on a rear side of the right fourth lighting body in the vehicle,
wherein, in a state in which the rear gate is fully opened, the left third lighting body is disposed at a left outer side of the left fourth lighting body in the vehicle width direction and on a rear side of the left fourth lighting body in the vehicle,
wherein, in the state the rear gate is fully opened, the right third lighting body is disposed at a right outer side of the right fourth lighting body in the vehicle width direction and on a rear side of the right fourth lighting body in the vehicle, and
wherein the left and right first lighting bodies, the left and right second lighting bodies, the left and right third lighting bodies and the left and right fourth lighting bodies are disposed so that a respective gap between the left and right first lighting bodies, the left and right second lighting bodies, the left and right third lighting bodies and the left and right fourth lighting bodies in the vehicle width direction are gradually reduced from a rear side of the vehicle toward a front side of the vehicle.

2. The lighting device for a vehicle according to claim 1, wherein the left and right third lighting bodies are disposed such that the left and right first lighting bodies, the left and right second lighting bodies, the left and right third lighting bodies and the left and right fourth lighting bodies continuously illuminate an outside of the vehicle and an inside of the vehicle in a state in which the rear gate is opened.

3. The lighting device for a vehicle according to claim 1, wherein the left and right third lighting bodies, the left and right second lighting bodies, and the left and right fourth lighting bodies are configured to be automatically turned on and off according to opening and closing of the rear gate.

4. The lighting device for a vehicle according to claim 1, wherein the left and right third lighting bodies, the left and right second lighting bodies, and the left and right fourth lighting bodies are disposed along left and right connecting lines in which a lateral gap is gradually reduced from the rear side of the vehicle toward the front side of the vehicle in a state in which the rear gate is opened.

* * * * *